UNITED STATES PATENT OFFICE.

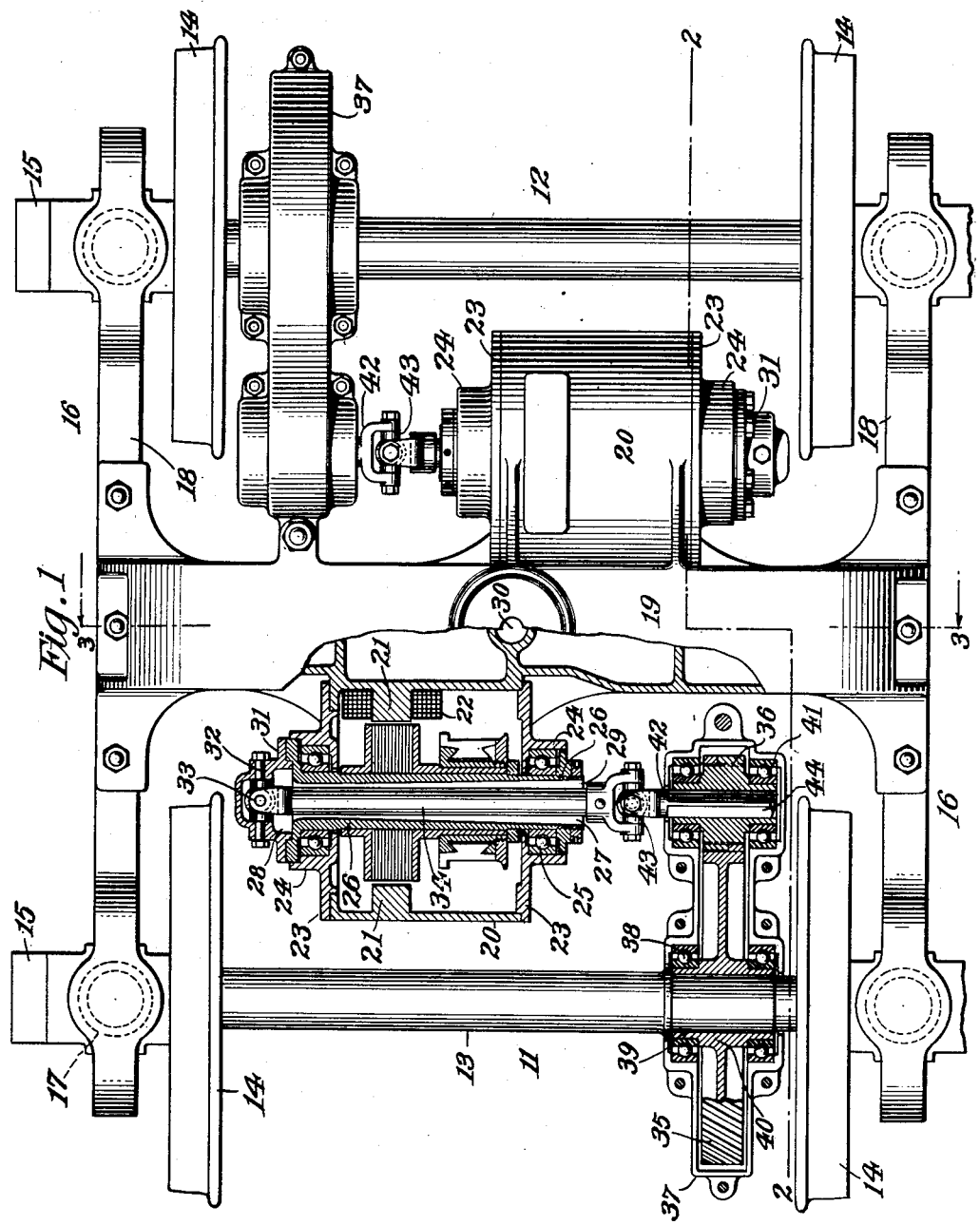

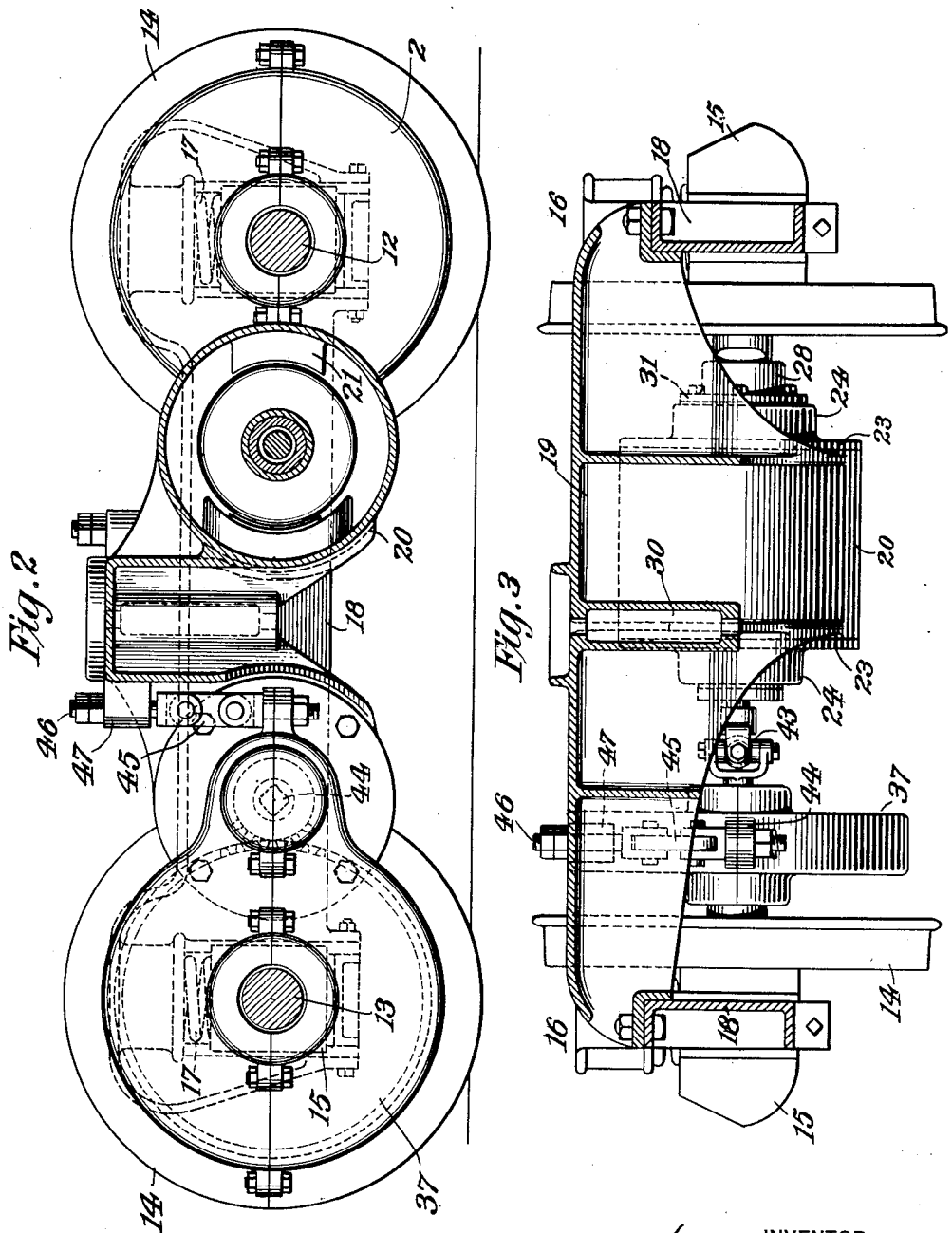

HOWARD J. MURRAY, OF BROOKLYN, NEW YORK, AND WALTER S. RUGG, OF PITTSBURGH, PENNSYLVANIA.

MOTOR-CASING-TRUCK CONSTRUCTION.

1,386,587.   Specification of Letters Patent.   Patented Aug. 2, 1921.

Application filed May 27, 1918. Serial No. 236,854.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Motor-Casing-Truck Construction, of which the following is a specification.

The invention relates in general to a truck construction constituting an element of a power system for use in an electrically driven vehicle of the flanged wheel type now common in electric railway constructions, and specifically relates to the truck bolster for supporting the motor and its driving connection with the axle of the vehicle running gears.

The invention in this application is of the same general class as the inventions defined in our copending application, filed under even date, entitled "Car motor mounting" Serial No. 236,856, and is illustrated in connection with a form of truck differing from that shown in the copending application, so as to demonstrate the applicability of the basic invention in transmission elements to different types of car constructions. The invention also constitutes one form of axle drive, another form of which is illustrated in our copending application, filed under even date and entitled "Single motor bolster" Serial No. 236,855.

The invention further relates to car and locomotive constructions of the type in which the electric motors are carried on the cushioned underframe or on some other resiliently supported support and in which each motor is operatively connected to one of the axles by flexible driving means.

In such constructions the space between the usual pair of axles carried by the truck is limited, so that one of the primary objects of the invention is to provide an organization of motors which may be designed relatively large and a mounting for these motors coördinated and arranged so that the axles will be driven independently of each other by their respective motors and through driving connections which, while permitting relative play between each of the motor shafts and the driven axle will maintain, as far as possible a positive and efficient drive.

One means by which the space-economical disposition of the power plant may be attached is to utilize the mass of some conventional part of the usual metallic car underframe or wheel truck structure, as part of the field producing means or frame of the two electric motors. It is further contemplated to utilize the space between each axle and the adjacent bolster element as well as the space between each pair of wheels in which to position the motors and the driving connections with the axles.

Another object of the invention is to provide a drive having high efficiency and incidental to this object it is a desideratum to provide the shortest possible length to the driving connection between each of the motors and its driven axle while permitting the necessary free play between the axle and its motor.

Various other objects and advantages of the invention will be in part obvious from an inspection of the accompanying drawings and in part will be more fully set forth in the following particular description of one form of mechanism embodying our invention and the invention also consists in certain new and novel features of construction and combination of parts hereinafter set forth and claimed.

In the accompanying drawings:

Figure 1 is a plan view looking down upon a truck, illustrating a two motor type of drive and constituting a preferred embodiment of the invention, with parts broken away to show internal construction;

Fig. 2 is a longitudinal sectional view taken on the line 2—2 of Fig. 1; and

Fig. 3 is a transverse sectional view taken on the line 3—3 of Fig. 2.

In the drawings there is shown a pair of running gears 11 and 12 each including an axle 13 to which are fixed flanged wheels 14. The running gears are revolubly mounted in journal boxes 15 shown in dotted lines in Fig. 2. These boxes constitute a support for a wheel truck 16 resiliently supported from the axles by means of springs 17 positioned between the boxes and the side sills 18 of the truck. The wheel truck includes a centrally positioned transverse member 19 in the form of a one piece casting, the upper portion of which constitutes a bolster and which also constitutes the king pin casting for pivotally connecting the truck with the car body (not shown).

The upper portion of this bolster when viewed in plan resembles the conventional bolster and in other respects the parts thus described are intended to represent conventional constructions.

However, this transverse member differs from the conventional bolster in several respects. It is double walled, is of materially greater depth, as shown in Figs. 2 and 3, than the conventional form and extends both above and below the side sills 18. Further it has a pair of motor casings 20 formed integrally therewith on opposite longitudinal sides and offset slightly from the longitudinal medial line through the device. The motor casings are of the conventional cylindrical form with their axes disposed transversely of the vehicle and paralleling the length of the bolster proper on opposite sides thereof. This casting is so proportioned and designed that the bolster proper and its motor casings coact to form a one-piece structure which in one form substantially fills all of the available space horizontally between the axles. This brings the two motors substantially in contact thus providing, in the limited available space between the axles in conventional forms of construction, the mounting of a pair of large type motors.

The motors are similar in construction so that a detailed description of one applies to the other with the necessary changes in position. Each of the motors is provided with a relatively massive shell 21' disposed to constitute in effect a depending beam portion of the bolster proper which shell tends to assist the bolster in resisting vertically torsional or other strains on the wheel truck. The shell is provided with an oppositely disposed pair of field pieces 21 the inner one of which is shown wrapped with windings 22 and is formed integrally with the portion of the casting common to the shell and to the upstanding wall of the bolster.

The motors are provided with end caps 23 which close the ends of the cylindrical casing and are provided with cylindrical extensions 24 which constitute housings for antifriction bearings 25 for the armature shafts 26.

These armature shafts differ from conventional constructions of these parts, in that they are in the form of hollow sleeves each provided with a frusto-conical bore 27 diverging from a closed end 28 toward an active end 29. The open end of one of the armature shafts is oppositely disposed from the open end of the other armature shaft so that the active ends of the motors will be oppositely disposed diagonally across the king pin opening 30. The end 28 is outwardly flanged and has secured thereto a closing cap 31 in which is mounted a transverse pin 32. The pin constitutes one element of a universal joint 33 for flexibly coupling a main driving shaft 34 to the armature shaft exteriorly of the outlines of the motor shell. This shaft extends through the open end of the bore and projects beyond the active end of the motor. By this construction the inner end of the driving shaft is permitted some freedom of rotation about a point relatively close to the adjacent wheel thus tending to provide a long driving connection in the space between the wheels. The free end of the shaft exterior of the motor is connected to drive the axle through a reducing gear train connection, which will also provide a flexible connection permitting not only play between the axle and driving shaft but also a slight relative play between the motor and shaft in a direction in line with the axis of rotation of the armature. The connection includes a relatively large spur gear 35 keyed to the axle adjacent the wheel facing the active end of the motor. This gear meshes with a relatively small gear 36 rotatably mounted to revolve about an axis coinciding with the normal axis of rotation of the armature shaft. The gear train formed by the gears 35 and 36 is inclosed in a light gear casing 37. This casing is formed of two parts bolted together and constitutes a journal box supporting the small gear 36 and in turn is loosely supported from the axle 13. For this purpose the portion of the casing inclosing the large gear 35 is provided centrally thereof with an anti-friction bearing 38, engaging extension 39 from opposite sides of the hub 40 of the gear 35.

This elongation of the gear hub provides an extensive bearing for the casing and distributes any strain thereon along the length of the axle for some material distance.

The portion of the casing containing the gear 36 is also enlarged to provide a housing containing an anti-friction bearing 41 for mounting the gear.

The driving connection between the armature shaft and the gear 36 includes a short shaft 42 constituting an extension of the shaft 29 and connected thereto by a universal joint 43. The shaft 42 includes a square portion 44 constituting a keyed connection with the gear 36 and mounted to slide axially in the gear. By this construction a positive rotary drive is provided between the driving connection and the first member of the gear train and at the same time longitudinal play is provided between the drive and the gear.

The casing is swung from the bolster element by means of a link 45 pivoted to an extension 44 from the casing and to a vertically extending rod 46 slidably mounted in a guiding sleeve 47 forming part of the bolster.

In operation it will be understood that each motor drives its correlated axle independently of the drive of the other axle. There is a simple and direct transmission of rotation from the high speed motor through the reducing gear train directly to the driven axle. Due to the universal pivotal connections at opposite ends of the main driving shaft relative independent movement in a vertical longitudinal plane between the armature shaft and the axle is permitted, and the squared key connection at the gear end of the driving shaft permits relative movement between the axle and armature shaft in a direction transversely of the length of the vehicle. Even during the shifting of the axle relative to the armature shaft, the positive driving connection is preserved, and as the angular variations between the axis of the armature and the axis of the driven shaft are small, transmission losses are reduced to a minimum.

In order to provide the necessary depth to accommodate the large motor casing used and so as not to bring the casings too close to the track bed, the bolster is designed to extend somewhat higher than conventional forms of truck bolsters. Accordingly a material portion of the casting extends above the level of the side sills of the truck, as shown more particularly in Fig. 3, but this adds strength to the framework without using any more metal than is necessary to form the magnetic-field-producing means. This raising of the bolster has the further advantage in that the gear wheel 35 may be made quite large thus reducing the number of gears in the gear train to the least possible number necessary to obtain the reduction of speed from the high speed motor to the relatively slow speed of the axle.

By this construction it is possible to utilize the massive metal necessary to give structural strength to the bolster, or other part of the framework, for the purpose of forming motor casings. Proportionately but little additional metal is needed to form the motor casings. Conversely electric motors with massive fields may be utilized without employing any other material for the formation of the casing than is necessary to give the requisite strength to the structural parts.

Further the motors can be cast integrally with the truck frame parts resulting not only in a saving of labor but also forming a rigid construction which will eliminate the possibility of the motors shaking loose from their supports.

The long bearing provided for the gear casing along the axis securely supports the small gear in position and acts to hold the same in a fixed engagement with the large gear. At the same time the flexible mounting of the casing from the bolster element permits it to give freely with the relatively movable parts.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

Having thus described our invention, we claim:—

1. In an electrically driven vehicle, the combination with a pair of running gears, a bolster constituting a structural part of the vehicle frame-work and positioned between said running gear, means for supporting the same resiliently from the running gears, an electric motor with its magnetic field producing elements constituting a part of the bolster thereby to utilize magnetically the massive metal constituting the frame, and a flexible power transmission between the motor and the running gear.

2. In an electrically driven vehicle, the combination of a resiliently mounted wheel truck, a metallic bolster constituting a structural part of the wheel truck and an electric motor with one of its magnetic field producing elements constituting a part of said metallic member, thereby to utilize magnetically the metal in the structural part of the vehicle frame-work, a wheel support spaced from said member and resilient means for supporting the metallic bolster from said wheel support.

3. In an electrically driven vehicle, the combination of a frame-work including a metallic bolster with a part thereof projecting to one side thereof longitudinally of the vehicle and constituting one of the electric-field-producing elements of an electric motor, an armature element coacting therewith to form an electric motor and an axle offset laterally from the armature element and operatively connected therewith.

4. A one-piece metallic casting constituting a bolster for forming part of a vehicle frame-work, said casting including a motor casing provided with an electric-field-producing element and provided with means for mounting an armature element in operative relation to said field producing element, an axle and a flexible driving connection between the armature element and the axle.

5. In a device of the class described, the combination with a running gear including an axle and wheels driven thereby, of a motor for driving said running gear, means for supporting the motor resiliently from the running gear, the motor being disposed relatively close to the axle and having its armature shaft substantially paralleling the axle, and a flexible driving connection between the armature shaft and said axle.

6. In a device of the class described, the combination with a running gear including an axle and wheels driven thereby, of a motor for driving said running gear, means for supporting the motor resiliently from the running gear, said motor provided with a hollow armature shaft disposed parallel to the axle, and a driving connection between the axle and shaft, said driving connection including a driving shaft extending through and pivoted to said hollow armature shaft.

7. In a device of the class described, the combination with a running gear including an axle and wheel driven thereby, of a motor for driving said running gear means for supporting the motor resiliently from the running gear so as to be free to move relative thereto, a shaft driven from the armature shaft of the motor, a flexible connection between said driven shaft and the armature shaft and a gear train including a plurality of gears with their axes of rotation disposed parallel to the axle connecting said driven shaft with said axle.

8. In a device of the class described, the combination with a running gear including an axle and wheels driven thereby, of a motor for driving said running gear, means for flexibly supporting the motor from the running gear whereby the motor is free to move in all directions relative to the axle, a flexible driving connection between the motor and axle, said connection including a gear train having axes of rotation extending parallel to and fixed relative to the axis of rotation of the axle, and a driving shaft including a universal joint flexibly connecting the armature shaft and the gear train.

9. In a device of the class described, the combination with a bolster, an axle and a pair of wheels fixed to and driven thereby, of a motor constituting a part of the bolster, movable therewith relative to the axle positioned between the axle and bolster to fill practically all of the space between the pair of wheels, thereby to bring the motor close to the axle, and a power transmission between the motor and axle, said transmission including a gear train positioned between one end of the motor and the adjacent wheel and a flexible connection between the gear train and the armature shaft of the motor.

10. In a device of the class described, the combination with an axle and a pair of wheels fixed to and driven thereby, of a motor positioned to one side of the axle and in the space between the pair of wheels on said side of the axle, thereby to bring the motor as close as is physically possible to the axle, means for supporting the motor resiliently from the wheels, and a flexible power transmission between the motor and axle, said transmission including a gear train offset laterally from the motor and positioned between one end of the motor and the adjacent wheel.

11. In a device of the class described, the combination with an axle and a pair of wheels fixed to and driven thereby, of a bolster positioned close to the axle, means for cushioning the bolster, a motor carried by the bolster and extending therefrom toward the axle and into the space between the wheels, said motor being spaced slightly from the axle thereby to permit relative movement therebetween and a flexible driving connection between the motor and the axle.

12. In a device of the class described, the combination of a truck provided with a pair of driving axles, wheels fixed to said axles to revolve therewith, said truck including a structural element positioned between the axles and resiliently supported therefrom, a pair of electric motors positioned on opposite sides of said element with their field-producing means formed integrally with said elements, each of said motors having the axis of their armatures fixed relative thereto, the armatures of each of said motors provided with a driving connection extending laterally therefrom for revolving the wheels of the axle adjacent thereto.

13. In a device of the class described, the combination of a truck bolster provided with a plurality of electric motors fixed relative to each other, a part of the field-producing means of each of said motors being formed integrally with said bolster, each of said motors provided with an armature having an axis of rotation fixed relative to the bolster and a wheel axle positioned exteriorly of the motors and operatively connected to one of the motors to be driven therein.

14. A structural part of a truck including a transversely disposed strain resisting member, a pair of electric motors disposed on opposite sides of said member, the shells of said motors being formed integrally with said member and a pair of axles disposed on opposite sides of said motors and operatively connected therewith.

15. A structural part of a truck including a casting, including a vertically disposed strain resisting wall and a cylindrical shell having its axis extending parallel to and offset from said wall and with a portion thereof formed of said wall and constituting part of the stationary field of an electric motor, said shell being positioned on said wall nearer one end than the other thereby to provide room for motor driven parts disposed to one side of the motor.

16. A structural part of a truck including a casting, including a vertically disposed strain resisting wall and a relatively thin and continuous cylindrical shell with a portion thereof formed of said wall and constituting part of the stationary field of an electric motor, a core formed integrally with the portion of the casting common to said wall and shell and adapted to provide massiveness to the field and to assist in resisting bending strains on said wall.

17. A bolster for wheel trucks, including a vertically disposed strain resisting wall and a cylindrical shell with a portion thereof formed of said wall and constituting part of the stationary field of an electric motor, and reinforcing webs connecting the exterior of said shell with a portion of the wall.

18. A bolster for wheel trucks including a cylindrical shell formed integral therewith and constituting part of the stationary field of an electric motor.

This specification signed this 20 day of May, 1918.

HOWARD J. MURRAY.
WALTER S. RUGG.